United States Patent Office 3,257,132
Patented June 21, 1966

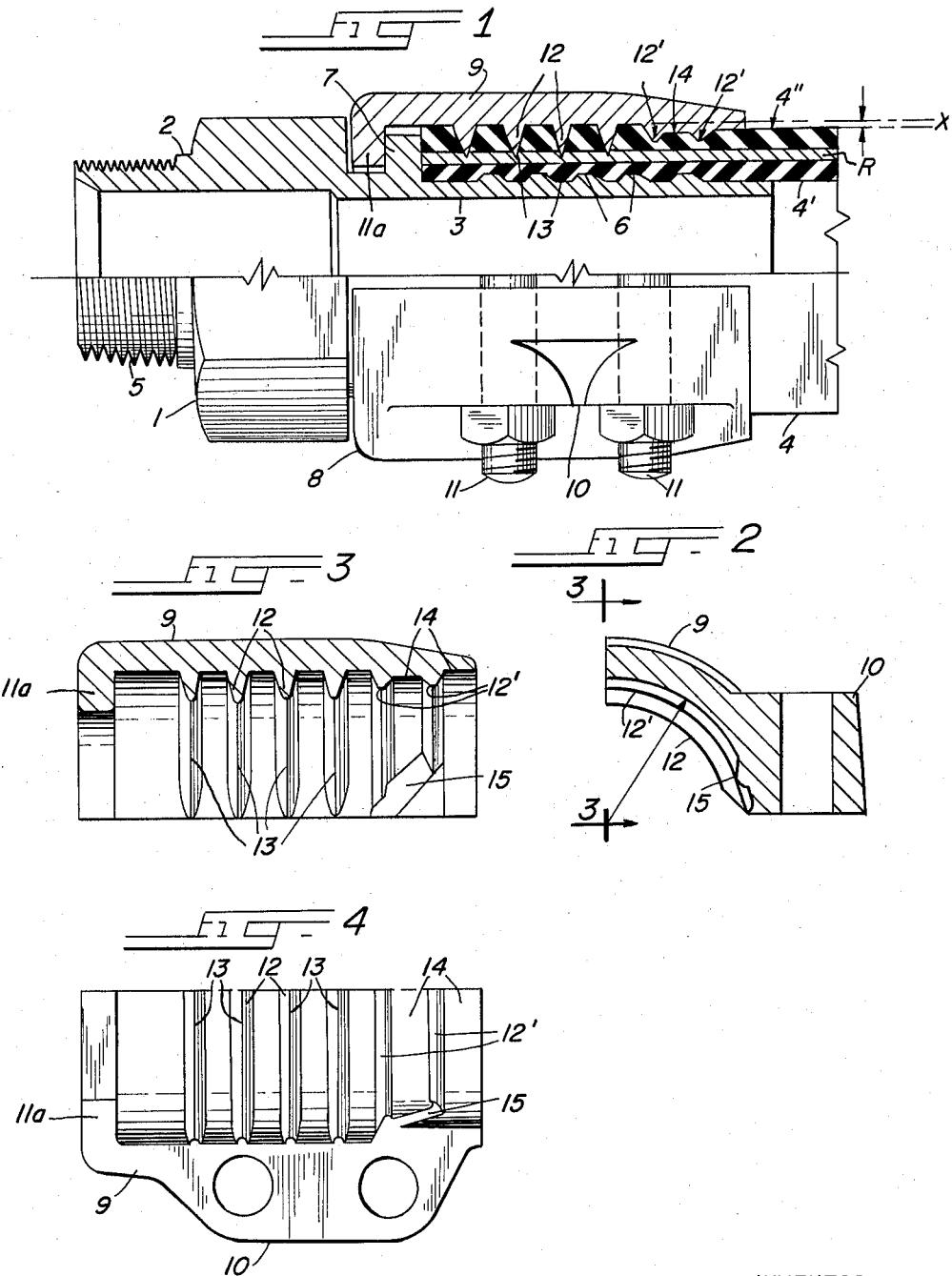

3,257,132
SPLIT CLAMP HOSE BITE COUPLING
Richard E. Lyons, Libertyville, Ill., assignor to Anchor Coupling Co. Inc., Libertyville, Ill., a corporation of Illinois
Filed Aug. 22, 1962, Ser. No. 219,020
4 Claims. (Cl. 285—253)

This invention pertains generally to split clamp hose couplings.

An important object of the invention is to provide simple and inexpensive means for effectively increasing the bite of the coupling on the end of a hose of the sort having an intermediate layer of wire reinforcement in the form of braid or a spiral wind.

Heretofore, in the application of conventional split clamp couplings, it has been customary to clamp the sectors directly on the outer cover of the hose, and since the gripping ribs merely engage the cover, the holding capacity of the coupling on the hose is almost entirely dependent upon the bond between the cover and reinforcement, which, under conditions of high or pulsating pressures, is often insufficient to avoid stripping of the cover material from the reinforcement and consequent blow-off of the coupling.

Therefore, without increasing the cost of the coupling, a more specific object of the invention is to provide the clamping sectors of the coupling with means for completely penetrating the cover of the hose upon contraction of the sectors, to the extent of impinging upon the intermediate layer of wire reinforcement and thus obtaining maximum gripping force upon the end of the hose, with minimum disturbance of the cover and its bond with the reinforcement.

A still further object is to provide the inner arcuate surfaces of the clamping sectors with spaced thin edged ribs of sufficient radial depth to penetrate the outer cover of the hose and engage the intermediate layer of wire reinforcement.

A still further object is to provide a coupling of the foregoing character with means at the inner ends of the clamping sectors, where flexing of the hose occurs, to reduce fatigue in that area and also prevent over-bite of the penetrating webs, as well as creating an effective seal against the entrance of moisture, with resultant rusting of the wire reinforcement at locations engaged by the penetrating ribs.

The foregoing and numerous other important objects, advantages and inherent functions of the invention will become apparent as the same is more fully understood from the following description, which, taken in connection with the accompanying drawings, discloses preferred embodiments of the invention.

Referring to the drawings:

FIGURE 1 is a partial sectional and partial elevational view of a coupling incorporating features of the present invention;

FIGURE 2 is a sectional view of one of the complementary clamping sectors, the same being taken substantially along line 2—2 in FIG. 1;

FIGURE 3 is a transverse sectional view taken along line 3—3 of FIG. 2; and

FIGURE 4 is a fragmentary elevational view of the inner face of the clamping sector shown in FIG. 2.

To illustrate the invention, the drawings show a coupling body 1, comprising an attaching head 2 provided with an extended sleeve-like insert 3 for projection into the end of a rubber or synthetic hose 4. The head may be provided with a threaded end 5 for attachment to an adaptor fitting or piece of equipment. Obviously, other forms of attachment may be employed without affecting the principle of the present invention.

The insert 3 is preferably provided with a series of external longitudinally spaced annular ridges 6 to more firmly hold the hose on the insert. Spaced inwardly from the attaching head 2, the insert 3 is also provided with an annular external flange 7, against which the end of hose 4 is abutted.

For the purpose of the present invention the hose 4, which is of conventional structure, consists of an inner tube 4', an intermediate layer of wire reinforcement R, and an outer synthetic cover 4", all of which are bonded together in the vulcanizing operation. While the wire reinforcement R may be of any form, conventional reinforcement consists of braided wire strands or spiral winds of wire. In either instance the invention to be described is equally applicable.

Secured upon the coupling body 1 and engaging the outer cover 4" of the hose 4, is a split clamp 8 comprising a pair of complementary semi-cylindrical sectors 9 provided with oppositely disposed radial flanges 10, for receiving connecting bolts 11 that serve to contract or draw the sectors 9 together upon the outer periphery of the hose and compress the hose wall between the sectors and the insert 3. The outer ends of the sectors 9 are provided with internal radial lips 11a for engaging the rear face of the annular flange 7. It is contemplated that other forms of inter-engagement between the sectors 9 and the coupling body 1 may be utilized within the scope of the invention.

The inner faces of the sectors 9 are provided with a series of longitudinally spaced gripping ribs 12, which in cross-section are wedge shaped terminating in relatively thin gripping knife edges 13. For most effective results the gripping ribs 12 are longitudinally located between the insert ridges 6 to create a simulated crimping of the hose wall. As best shown in FIG. 1, the arcuate ribs 12 are of sufficient depth in cross-section to completely penetrate the hose cover 4" and impinge the wire reinforcement R. However, the extent of such impingement is not sufficient to mutilate or seriously disturb the structure of the reinforcement. As a matter of fact, the thin edges 13 of the gripping ribs merely disclose slight marks or impressions of the reinforcing wire pattern upon removal of the sectors for observation.

That portion of the inner arcuate faces of the clamping sectors 9 on which the ribs 12 are formed is of slightly larger diameter than the normal O.D. of the hose 4, as indicated by the dimensional lines X on FIG. 1. The purpose of this is to compensate for displacement of the outer cover 4" caused by penetration of the wedge shaped ribs 12, thus avoiding disturbances of the cover material as far as possible, and maintaining a substantial bond between the cover and reinforcement R.

At the inner end of the sectors the internal arcuate faces 14 have approximately the same or slightly less than the O.D. diameter of the cover 4" and the faces 14 are provided with a plurality of annular spaced squeezing ribs 12', which are of less depth than the gripping ribs 12, and press into the surface portions only of the outer cover portions 4" of the hose. As a result of the foregoing the greatest compression of the hose wall results in the location of the faces 14, and because flexure of the hose occurs in this area, such compression serves to strengthen the hose wall and oppose flexing action, to the extent of reducing hose fatigue and possible leakage at this point. Also, such compression creates a tight seal between the sectors and hose cover at the inner ends of the sectors to prevent entrance of moisture, which if allowed to seep into the coupling between the sectors and hose cover might eventually reach the wire reinforcement at points engaged by the webs 12, causing the reinforcement to rust and weaken. At the same time, because the hose wall is compressed to approximately its maximum capacity in the area of the reduced faces, the compressed wall serves as a stop to prevent penetration of the ribs 12 into the wire reinforcement and resultant undue mutilation or severing of the reinforcement strands.

Inasmuch as considerable compression of the hose wall occurs in the location of the reduced faces 14, there is a tendency for the cover 4″ to flow radially and extrude through the longitudinal spaces between the flange 10 faces of the sectors. To retard such extrusion, a dam 15 is formed on the sectors between the shorter ribs 12′.

From the foregoing explanation, considered in connection with the accompanying drawing, it will be apparent that exceedingly simple and inexpensive means has been devised for materially enhancing the gripping function of the sectors in conventional split clamp type couplings, thereby eliminating the tedious and costly operation of stripping the outer cover of the rubber or synthetic hose in order to engage the wire reinforcement. At the same time, undue disturbances or weakening of the hose wall structure is avoided, as well as stiffening the hose wall in the area of flexing, and eliminating entrance of moisture and resultant rusting of the reinforcing wire.

It is thought that the invention and its numerous attendant advantages will be fully understood from the foregoing description, and it is obvious that changes may be made in the form, construction and arrangement of the several parts without departing from the spirit and scope of the invention, or sacrificing its attendant advantages, the form herein disclosed being a preferred embodiment for the purpose of illustrating the invention.

The invention is hereby claimed as follows:

1. In a split clamp type coupling for attachment to a hose of elastic, rubbery material having an inner layer, a cover and an embedded reinforcing layer disposed between the inner layer and the cover, comprising a coupling body including an attaching head having an extended insert sized to fit snugly within the end of said hose, the outer diameter of said insert being at least approximately equal to the inner diameter of the hose, a pair of complementary semicylindrical sectors interlocked on said coupling body and engaging the outer surface of the hose to clamp the same on said insert, means for clamping said sectors on said coupling body and hose, and spaced annular wedge shaped gripping ribs formed on the arcuate inner faces of each sector for penetrating the hose cover and engaging the embedded reinforcing layer upon contraction of said sectors on said hose, the inner arcuate faces between said gripping ribs being of slightly larger diameter than the normal outer diameter of the hose, said sectors adjacent their inner ends having inner face portions of diameter no larger than the normal outer diameter of said hose, said insert having an inner end remote from said attaching head and sized to extend opposite the inner face portions of the sectors, whereby to clamp the hose firmly between the inner end of the insert and said inner face portions of the sectors, said inner face portions pressing upon the surface portions only of said cover, whereby compression of the hose is appreciably greater in the area of said inner face portions than at said gripping ribs and the inner arcuate surfaces therebetween.

2. In a slit clamp type coupling for attachment to a hose of elastic, rubbery material having an inner layer, a cover and an embedded reinforcing layer disposed between the inner layer and the cover, comprising a coupling body including an attaching head having an extended insert sized to fit snugly within the end of said hose, the outer diameter of said insert being at least approximately equal to the inner diameter of the hose, a pair of complementary semicylindrical sectors interlocked on said coupling body and engaging the outer surface of the hose to clamp the same on said insert, means for clamping said sectors on said coupling body and hose, and spaced annular wedge shaped gripping ribs formed on the arcuate inner faces of each sector for penetrating the hose cover and engaging the embedded reinforcing layer upon contraction of said sectors on said hose, the inner arcuate faces between said gripping ribs being of slightly larger diameter than the normal outer diameter of the hose, said sectors adjacent their inner ends having inner face portions of diameter slightly less than the normal outer diameter of said hose, said insert having an inner end remote from said attaching head and sized to extend opposite the inner face portions of the sectors, whereby to clamp the hose firmly between the inner end of the insert and said inner face portions of the sectors, said inner face portions pressing upon the surface portions only of said cover, whereby compression of the hose is appreciably greater in the area of said inner face portions than at said gripping ribs and the inner arcuate surfaces therebetween.

3. In a split clamp type coupling for attachment to a hose of elastic, rubbery material having an inner layer, a cover and an embedded reinforcing layer disposed between the inner layer and the cover, comprising a coupling body including an attaching head having an extended insert sized to fit snugly within the end of said hose, the outer diameter of said insert being at least approximately equal to the inner diameter of the hose, a pair of complementary semicylindrical sectors interlocked on said coupling body and engaging the outer surface of the hose to clamp the same on said insert, means for clamping said sectors on said coupling body and hose, and spaced annular wedge shaped gripping ribs formed on the arcuate inner faces of each sector for penetrating the hose cover and engaging the embedded reinforcing layer upon contraction of said sectors on said hose, the inner arcuate faces between said gripping ribs being of slightly larger diameter than the normal outer diameter of the hose, said sectors adjacent their inner ends having inner face portions of restricted size and of diameter no larger than the normal outer diameter of said hose, said face portions of restricted size having spaced arcuate squeezing ribs of substantially less depth than the depth of said gripping ribs, said insert having an inner end remote from said attaching head and sized to extend opposite the inner face portions of the sectors, whereby to clamp the hose firmly between the inner end of the insert and said inner face portions of the sectors, said arcuate squeezing ribs pressing into the surface portions only of said cover, whereby greatest compression of the hose is accomplished at said squeezing ribs.

4. In a split clamp coupling as set forth in claim 3, the combination of dams formed on the inner faces of said sectors, between said squeezing ribs, adjacent the meeting edges of the sectors to prevent extrusion of the hose material at said edges.

References Cited by the Examiner

UNITED STATES PATENTS

| | | | |
|---|---|---|---|
| 817,058 | 4/1906 | Greenfield | 285—243 |
| 2,120,275 | 6/1938 | Cowles | 285—243 |
| 2,147,355 | 2/1939 | Scholtes | 285—259 |
| 2,367,447 | 1/1945 | Strout | 285—259 |
| 2,797,111 | 6/1957 | Beazley | 285—259 |
| 2,816,781 | 12/1957 | Woodling | 285—259 |
| 3,073,628 | 1/1963 | Cline | 285—243 |
| 3,087,746 | 4/1963 | Hamilton | 285—243 |
| 3,142,502 | 7/1964 | Luther | 285—259 X |
| 3,191,975 | 6/1965 | La Marre et al. | 285—243 |

FOREIGN PATENTS 1,227,889    3/1960    France.

CARL W. TOMLIN, *Primary Examiner.*

THOMAS F. CALLAGHAN, *Examiner.*